March 15, 1955
E. E. GOLDSMITH
2,704,231
MAGNETIC BEARINGS
Filed March 31, 1949
3 Sheets-Sheet 1
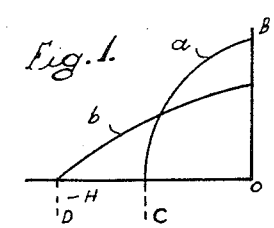
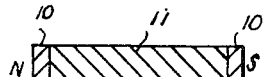
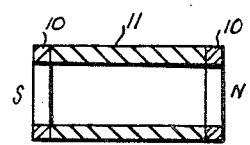
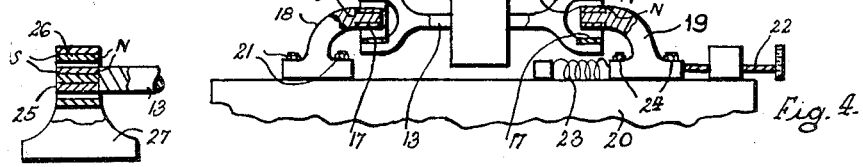
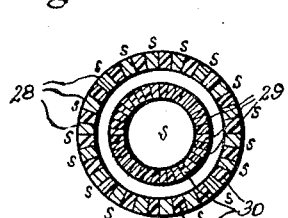
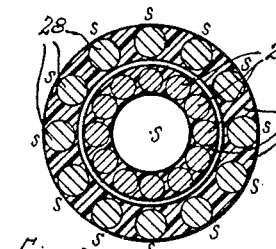
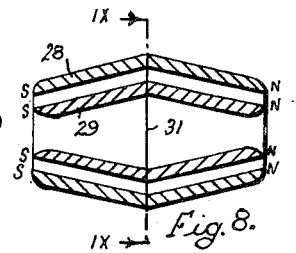
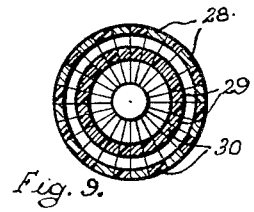
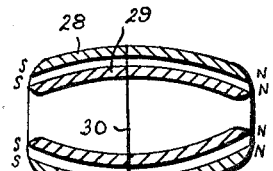
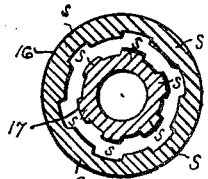
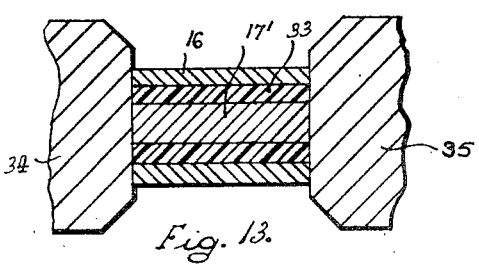
INVENTOR
ERNEST EMIL GOLDSMITH,
By John B. Brady
ATTORNEY March 15, 1955 E. E. GOLDSMITH 2,704,231
MAGNETIC BEARINGS Filed March 31, 1949 3 Sheets-Sheet 2

INVENTOR
ERNEST EMIL GOLDSMITH,
by John B. Brady
ATTORNEY

March 15, 1955　　　E. E. GOLDSMITH　　　2,704,231
MAGNETIC BEARINGS

Filed March 31, 1949　　　　　　　　　　3 Sheets-Sheet 3

INVENTOR
ERNEST EMIL GOLDSMITH,

By John B. Brady
ATTORNEY

United States Patent Office 2,704,231
Patented Mar. 15, 1955

2,704,231

MAGNETIC BEARINGS

Ernest Emil Goldsmith, Johannesburg, Transvaal, Union of South Africa

Application March 31, 1949, Serial No. 84,661

Claims priority, application Great Britain April 2, 1948

13 Claims. (Cl. 308—10)

This invention relates to magnetic bearings and has for its main object to provide an improved bearing by which a body can be supported wholly, or at least to a substantial extent, magnetically.

By a bearing is meant means to support a body in such a manner as to permit movement of the body relatively to the support in rotation, partial or oscillatory rotation, or in translation in a plane or otherwise.

Demagnetization curves for modern permanent magnet alloys show that alloys giving their maximum energy product $(BH)_{max}$ at high flux densities like for instance Alnico V, Ticonal G, Alcomax II have a coercive force smaller than certain other alloys like for instance Alnico XII, Reco, Ticonal E, Hycomax I which, in turn, give their maximum external energy at lower flux densities. This is illustrated in Fig. 1 of the accompanying drawing where there are shown curves of flux B plotted against demagnetizing force $-H$. Materials such as Alnico V may have a curve such as that at $a$ where the coercive force is represented by OC and materials such as Alnico XII may have a curve such as $b$ where the coercive force is OD.

The invention is based partly upon the realization that the flux densities of the magnets used in bearing arrangements is greater near the neutral zones of the magnets than in the polar zones or ends, and that there may be employed with advantage permanent magnets whose central or neutral zones consist of a magnetic material of the kind first mentioned, hereinafter referred to as the kind $a$ (see Fig. 1), and whose polar or end zones consist of magnetic material of the second-mentioned kind, hereinafter referred to as the kind $b$. In effect, the central zones of the magnets employ materials capable of giving their maximum energy at high flux densities, materials used in the polar or end zones giving their maximum energy at lower flux densities. Through this combination of different types of magnetic materials a larger amount of external energy is obtainable from a given volume of magnetic material and the mutual demagnetizing effect of magnets acting in opposition is substantially reduced. There are numerous ways of combining the different magnetic materials of an individual magnet, as for instance by clamping, screwing, welding, spot-welding at a few points at their junction, external bonding by means of sleeves of plastic materials or by shrinking sleeves of copper or other suitable metal over their junction zones.

One object of the invention is, therefore, to provide a permanent magnet system in which two or more magnets are positioned to exert repulsive forces upon one another and in which each magnet is composed partly of a material of relatively high coercive force giving its maximum energy product at a higher flux density than the other material of the magnet.

In many magnetic bearing arrangements certain magnets partly or wholly envelop certain other magnets. The latter will be subject to a larger demagnetizing effect than the former and will thus not be able to operate at the $(BH)_{max}$ point of the demagnetization curve of the material used, if the material used is the same for both. If, however, the enveloped or partly enveloped magnet or magnets are made from a material $b$ having its optimum working point on its demagnetization curve at a value of coercive force greater than the value of coercive force corresponding to the $(BH)_{max}$ point of the material $a$ of the enveloping magnet, then both magnets can work at or near their optimum points.

A further object of the invention is to provide a magnetic bearing comprising two permanent magnets one of which at least partly surrounds the other in which the outer magnet is of a material having a lower coercive force than the inner magnet.

The invention will be described by way of example with reference to Figs. 2 to 23 of the accompanying drawings in which:

Fig. 1 is a curve diagram showing curves of flux plotted again demagnetizing force;

Figs. 2 and 3 show respectively in cross-sectional elevation bar and cylindrical magnets for use in one form of the invention;

Fig. 4 is a view in part-sectional elevation of one embodiment of the invention;

Fig. 5 is a view in part-sectional elevation of a modification of part of Fig. 3;

Figs 6 and 7 are views in cross section perpendicular to the axis of rotation of alternative forms of bearing according to the invention;

Figs. 8 and 9 are views in sectional elevation and cross section on the line IX—IX of Fig. 8 respectively of a further form of bearing according to the invention;

Fig. 10 is a view in sectional elevation of another form of bearing according to the invention;

Figs. 11, 12, 14 and 15 are end elevations of other forms of bearing according to the invention;

Fig. 13 is a view in section illustrating a method of magnetizing bearings according to the invention;

Figure 22:
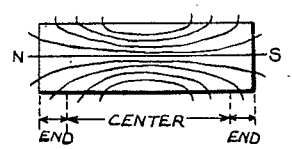
Fig. 22 is a theoretical diagram explaining the normal distribution of magnetic lines through a bar magnet.
Figure 23:
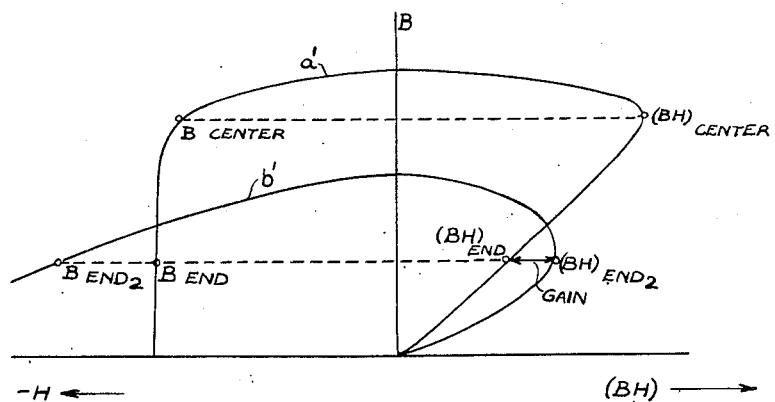
Fig. 23 is a curve diagram showing the advantages obtained by the system of my invention employing end portions for the magnet of higher coercive force than the central zones thereof.

Fig. 22 shows the distribution of magnetic lines of force through a conventional bar magnet from which it will be observed that the center section of the bar magnet is operating at larger flux density than the two end sections, owing to the considerable flux leakage through the side surfaces. Fig. 23 shows to the left of the ordinate (the B-axis) the demagnetization curves of two permanent magnet materials "$a'$" and "$b'$" and to the right, the energy product curves $(B \times H)$ indicating the external energy due to unit length of the magnet. Assuming the whole magnet to be of material "$a'$," if point $B_{center}$ is typical for the average flux density in the central portion, point $B_{end}$ will be typical for the average very much lower flux density in the two end portions. The specific external energy is indicated by point $(BH)_{center}$ and that of the two end portions by point $(BH)_{end}$. It will be seen that the end portions cannot exhibit the full amount of magnetic energy this material is capable of exerting. It may therefore be definitely stated that the ends run magnetically inefficiently.

This condition changes, however, if the end portions of the magnet are replaced by a material of higher coercive force (curve $b'$, Fig. 23) which will give its maximum $(BH)$ at the average flux density of those end portions. $(BH)_{end_2}$ can be seen to be very much larger than the original amount $(BH)_{end}$. It is this gain of externally available energy due to making the ends of a material of higher coercive force than the central portion of the magnet which provides the "advantage" hereinbefore stated.

Referring to Fig. 2, there is shown a longitudinally magnetized bar magnet having its polar portions 10 of material $b$ having a relatively high coercive force and its central portion 11 of a material $a$ having a lower coercive force than material $b$ but giving its maximum energy product at a higher flux density than the material $b$. Such a magnet is therefore of considerable advantage where it is to be used to repel a like magnet with both its poles near to like poles on the other magnet. Uses for such a magnet will be described later. A tubular or hollow cylindrical magnet of the same composite construction and axially magnetized is shown in Fig. 3. In all the figures where magnets are shown in section the direction of cross-hatching employed for the materials *a* and *b* is the same.

Figure 4 shows a body 12 mounted upon a shaft 13 having cup-shaped ends 14 and 15. Within each of these cups is fixed a ring-shaped magnet 16 of material *a* axially magnetized as shown. Within each cup is a ring-shaped magnet 17 also axially magnetized and of material *b* fixed to a pedestal support 18 and 19. The adjacent poles of the permanent magnets 16 and 17 are of like polarity so that these magnets repel one another and the inner magnet 17 thus tends to float within the outer magnet 16.

In order to locate the body 12 and shaft 13 axially the magnet 16 within cup 14 has its end S (assumed to be magnetized to south polarity) slightly displaced axially to the right relatively to the corresponding end of the magnet 17 within it. The end N of the magnet 16 within the cup 15 is slightly displaced axially to the left relatively to the corresponding end of the magnet 17 within it. The result is to provide magnetic thrust which tends to center the shaft 13.

As shown, the pedestal 18 is fixed to a base 20 by bolts 21 while the pedestal 19 is adjustable by means of a screw 22 acting against a return spring 23 in order to permit adjustment of the axial centering thrust. After adjustment the pedestal 19 can be clamped to the base 20 by tightening bolts 24.

If desired one or both the bearings in Fig. 4 may be inverted as shown in Fig. 5, the shaft magnet 25 being of material *b* and being located within the bearing magnet 26 of material *a* which is fixed to a pedestal 27.

Instead of using continuous hollow cylindrical magnets as shown in Figs. 4 and 5, the magnets may be built up of a number of bar magnets arranged with their longitudinal axes parallel to the axis of rotation as shown in Figs. 6 and 7. The bearing is formed of bar magnets 28 of material *a* and the shaft magnet structure is formed of bar magnets 29 of material *b*.

Preferably the bar magnets are spaced apart, for example by a distance approximately equal to their widths in order to provide return paths for the magnetic flux and thus improve the efficiency. The spaces between the magnets may be filled with any suitable metallic or non-metallic, non-magnetic material 30 such as bearing metal or, as shown, a molded plastic. If bearing metal is used, this is particularly suitable to take up the bearing load in the event of actual contact taking place between the bearing and the shaft magnet structure. This is particularly readily accomplished in the arrangement of Fig. 7 where the magnets are of circular cross-section. The spacing material may be arranged to extend over the magnets in order to prevent actual contact between the magnets with consequent demagnetization.

Other forms that the magnets may take are shown in Figs. 8 and 9 and in Fig. 10. In Figs. 8 and 9 the outer bar magnets 28 and if desired the inner bar magnets 29 also, are formed of two magnets abutting in the plane 31. The bearing is divided in the plane 31 in order to permit of assembly. The shape of the co-operating surfaces of the magnets 28 and 29 in Fig. 10 may be ellipsoidal or spherical for example.

Another means of providing return paths for the flux is by providing in one or both of the facing magnet surfaces recesses parallel to the axis of rotation. Examples are shown in Figs. 11 and 12 where the surfaces of both magnets 16 and 17 are recessed. In Fig. 12 the recesses are shown filled with bearing metal 32.

It should be pointed out that it is not an essential feature of the invention that the bearing surface and the surface supported thereon should be out of contact with one another although for many purposes this is preferred. Great advantages in reduction of bearing pressure can be obtained by use of the present invention when the surfaces are normally in engagement. The material 32 may be of the self-lubricating type which can be pressed on to the magnets by powder metallurgical processes.

For many purposes where magnetic axial thrust forces are not required to be exerted it is desirable that the magnets 16 and 17 should be made of exactly the same length and exactly in the correct register with one another in order to obtain maximum repulsive forces between them. Such magnets are preferably magnetized after location in their correct relative positions and maintained in these positions thereafter. For this purpose as shown in Fig. 13 the magnets 16 and 17' may be fixed in their proper relations, for example by interposing between them readily soluble or fusible material 33. The structure is then placed between magnetizing poles 34 and 35 and magnetized, after which the magnets are fixed in their operating positions and the material 33 is then dissolved or melted and so removed.

The combined length/cross section ratio of axially magnetized magnets co-operating with each other in opposition should be such that—allowing for the permeance available for the return fluxes—the neutral zones of the magnets are operating at or near the $(BH)_{max}$ point of the material. Where the end zones of the magnets consist of a different magnetic material as described above, the same applies to them. By combined length/cross section ratio is meant the ratio of length to the sum of the cross sections of the magnets in opposition. In the case of a ring magnet co-operating with another magnet in opposition, the combined cross section would be the cross-section of the latter plus the cross section of that part of the ring magnet which is in close vicinity to it.

Figure 14:
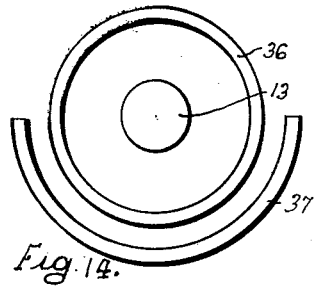

In Fig. 14 the axially magnetized ring magnet 36 is mounted on a shaft 13 and the bearing magnet 37 is also axially magnetized but is in the form of a part-cylinder. In the example shown it subtends an angle of less than 180° at the axis of the shaft but this angle may be greater than 180° in some cases. The magnet 36 is of material *b* and the magnet 37 of material *a*.

Figure 15:
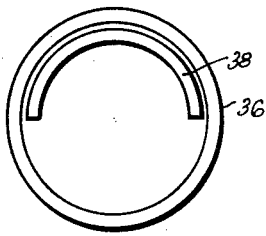

In Fig. 15 the bearing magnet 38 is of the same shape as the magnet 37 in Fig. 14 but is mounted within the magnet 36 and is therefore of material *b*, the magnet 36 being of material *a*.

A bearing magnet 38 within the magnet 36 and a bearing magnet 37 outside this magnet may be used simultaneously in which case if the magnet 37 is of material *a* and the magnet 38 of material *b*, the magnet 36 is preferably of a material having magnetic properties between those of materials *a* and *b*.

The magnets of Figs. 14 and 15 may be built up of bar magnets as described with reference to Figs. 6 and 7.

Supporting parts, such as the cups 14 and 15 and pedestals 18, 19, 27 in Figs. 4 and 5, if not of non-metallic material are preferably of non-magnetic metal such as bronze.

Figure 16:
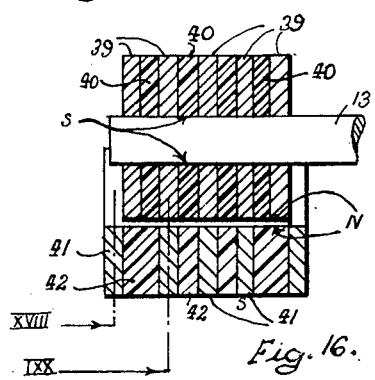
Fig. 16 is a view in cross-sectional elevation of the bearing in Fig. 17.
Figure 17:
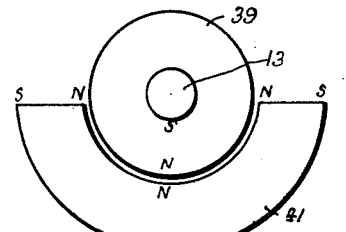
Fig. 17 is an end elevation of another form of bearing.

The way in which radially-magnetized magnets may be used is illustrated in Figs. 16 and 17. The magnet fixed to shaft 13 is built up of a number of discs 39 of material *b* spaced apart preferably by about the thickness of the discs by non-magnetic material 40 such as plastic. The bearing magnet is similarly constructed of arcuate members 41 of material *a* spaced apart by non-magnetic material 42. The two end members 41 are located just outside the outer planes of the outer discs 39 in order to provide an axial centering action. As shown the two magnet structures are radially magnetized.

Figure 18:
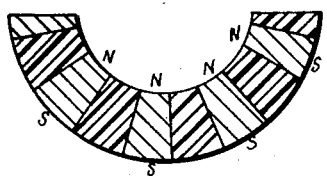
Figs. 18 and 19 show a modification of the arrangements of Figs. 16 and 17 in cross-sectional views on the lines XVIII and XIX respectively of Fig. 16.
Figure 19:

The magnet structures 39, 40 and 41, 42 may be built up of bar magnets somewhat as described with reference to Figs. 6 and 7. The structure 41 in Fig. 17 then has the appearance shown in Fig. 18. If desired alternate arcuate sectors may have the forms shown in Figs. 18 and 19 respectively so that a magnet in one sector is adjacent a non-magnetic spacer in the next sector.

The bearing magnet structures 41, 42 in Figs. 16 and 17 and corresponding magnets in other figures may be mounted in gimbals so that their axis and thus the axis of the ring magnet structure 39, 40 and the shaft fixed thereto are always horizontal. The bearing is in this way applicable to gyroscopes.

Other means of taking up axial thrust are ring magnets magnetized in the direction parallel to the axis and bearing magnets of a cross section in the shape of the letter C and magnetized in the direction around the C. The poles of the bearing magnet may be arranged to extend to regions close to and on either side of the shaft magnet. This arrangement has the additional advantage that due to the axial thrusts being balanced, the bearing acts as a journal and two way thrust bearing.

Further means may be provided to take up moments in a horizontal plane exerted by the main magnetic bearing by help of additional bearing magnets mounted, preferably near or in the central horizontal plane of the shaft, in close opposition to that part of the shaft ring magnet situated in or near that plane.

The invention is applicable where a body is required to rotate within an evacuated envelope. In this case, the bearing magnet may be disposed outside the envelope. When a shaft magnet is arranged to rotate within a bearing magnet the envelope may be suitably shaped to extend through the gap between these parts. Torque may be applied to the body within the envelope in order to set it in rotation by means of the bearing magnets. At least one of these bearing magnets is rotatably mounted and is driven by suitable means, the co-operating surfaces on the body and rotating ring magnet being shaped in such a way that they lock magnetically and resist relative rotation. For example each surface may be serrated, the angular pitch of the serrations of the two co-operating surfaces being the same. The co-operating surfaces will then tend to lock in a position in which the reluctance of the path between them is a minimum. In this case one of the ring magnets acts both as a bearing and as a driving means for the body within the envelope.

The invention is also applicable to the support of bodies out of contact with their supporting means even when the relative motion between the body and support is translational or even when the permitting of relative movement is not the primary purpose or when the body is mounted for limited rotary or axial movement only.

Figures 20, 21:
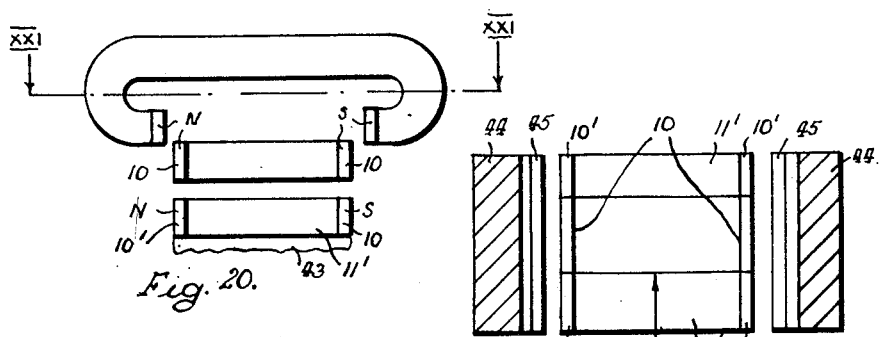
Figs. 20 and 21 are diagrammatic views in elevation and sectional plan on the line XXI—XXI of Fig. 20 of an alternative form of the invention.

An example where the movement permitted is translational in a plane is shown in Figs. 20 and 21. A bar magnet 10, 11 of the kind shown in Fig. 2 constitutes the movable member and beneath it is a like magnet 10', 11' of greater breadth (perpendicular to the paper in Fig. 20) fixed to a base member 43. The directions of magnetization is as shown the same for both magnets. A further magnet comprising a central portion 44 of material $a$ and end portions 45 of material $b$ is arranged to guide the magnet 10, 11 laterally. The magnet 10, 11 is then supported but free to move in the directions of the arrows 46.

Bearing and shaft magnets are preferably shielded by suitable means to prevent straying of the fields.

While the above described arrangements are set out to act through magnetic repulsion, they may, however, be combined with other permanent magnets or with soft magnetic material mounted above the shaft magnets and aiding the magnetic suspension by attraction.

Combinations of the above described arrangements with each other and with known magnetic suspension types will suggest themselves.

I claim:

1. A magnetic structure comprising two permanent magnets positioned to exert repulsive force upon one another, one of said magnets at least partly enveloping the other of said magnets, said magnets being of different magnetic materials, the outer of said magnets being of a permanent magnet material having a lower coercive force than the material of the inner of said magnets thereby reducing the demagnetizing effect of the outer of said magnets upon the inner of said magnets.

2. A magnetic bearing arrangement for supporting a body for movement about an axis, said arrangement comprising two permanent magnets disposed one at least partly within the other with their facing surfaces of substantially like shape each in the form of at least part of a surface of revolution, said magnets being magnetized to repel one another, and a bearing support, one of said magnets being fixed to said body and the other being fixed to said bearing support, the outer of said magnets being of a permanent magnet material of lower coercive force, and giving its maximum energy product at a higher flux density, than the inner of said magnets thereby reducing the demagnetizing effect of the outer of said magnets upon the inner of said magnets.

3. An arrangement according to claim 2, wherein said magnets are magnetized in a radial direction with respect to said axis.

4. A magnetic bearing arrangement for supporting a body for movement about an axis, said arrangement comprising two permanent magnets disposed one at least partly within the other with their facing surfaces of substantially like shape each in the form of at least part of a surface of revolution, said magnets being magnetized to repel one another at said surfaces, and a bearing support, one of said magnets being fixed to said body and the other being fixed to said bearing support, at least one of said magnets being constituted by members of magnetic material arranged substantially parallel to one another side by side in magnetic opposition and spaced apart by non-magnetic material.

5. An arrangement according to claim 4, wherein said members are discs and the thickness of said non-magnetic material is substantially equal to the thickness of said discs.

6. An arrangement according to claim 4, wherein said members are disc sectors and the thickness of said non-magnetic material is substantially equal to the thickness of said disc sectors.

7. A magnetic structure comprising two permanent magnets positioned to exert repulsive force upon one another, said structure being in at least two parts of different permanent magnet materials, one of said permanent magnet materials having a lower coercive force than the other of said permanent magnet materials and giving the maximum energy product at a higher flux density than the other of said materials, thereby reducing the demagnetizing effect of said one of said permanent magnets on said other of said permanent magnets.

8. A magnetic bearing arrangement for supporting a body for movement about an axis, said arrangement comprising two permanent magnets disposed one at least partly within the other with their facing surfaces of substantially like shape each in the form of at least part of a surface of revolution, said magnets being magnetized to repel one another at said surfaces, and a bearing support, one of said magnets being fixed to said body and the other being fixed to said bearing support, the outer of said magnets being constituted by members of magnetic material spaced apart by non-magnetic material.

9. A magnetic structure according to claim 7, wherein one of said permanent magnets is at least partly within the other and the material of said one permanent magnet is that having the higher coercive force.

10. A magnetic bearing arrangement as set forth in claim 2 in which said magnets are magnetized in a direction parallel to the axis about which the body moves.

11. A magnetic bearing arrangement as set forth in claim 2 wherein at least one of said permanent magnets is formed by a plurality of bar magnets.

12. A magnetic bearing arrangement as set forth in claim 2 wherein at least one of said permanent magnets is formed by a plurality of bar magnets transversely spaced apart by non-metallic material.

13. A magnetic structure as set forth in claim 7 wherein the one of said magnetic materials that is of higher coercive force than the other constitutes polar portions of one of said permanent magnets and the one of said magnetic materials that is of lower coercive force constitutes the central portions of such permanent magnets where said central portions of the permanent magnets operate at a higher flux density than the polar portions thereof.

References Cited in the file of this patent

UNITED STATES PATENTS

| 2,102,409 | Faus | Dec. 14, 1937 |
| 2,333,647 | Green | Nov. 9, 1943 |
| 2,340,122 | Hansen | Jan. 25, 1944 |
| 2,351,424 | Hansen | June 13, 1944 |

FOREIGN PATENTS

| 539,409 | Great Britain | Sept. 9, 1941 |